United States Patent Office 2,907,349
Patented Oct. 6, 1959

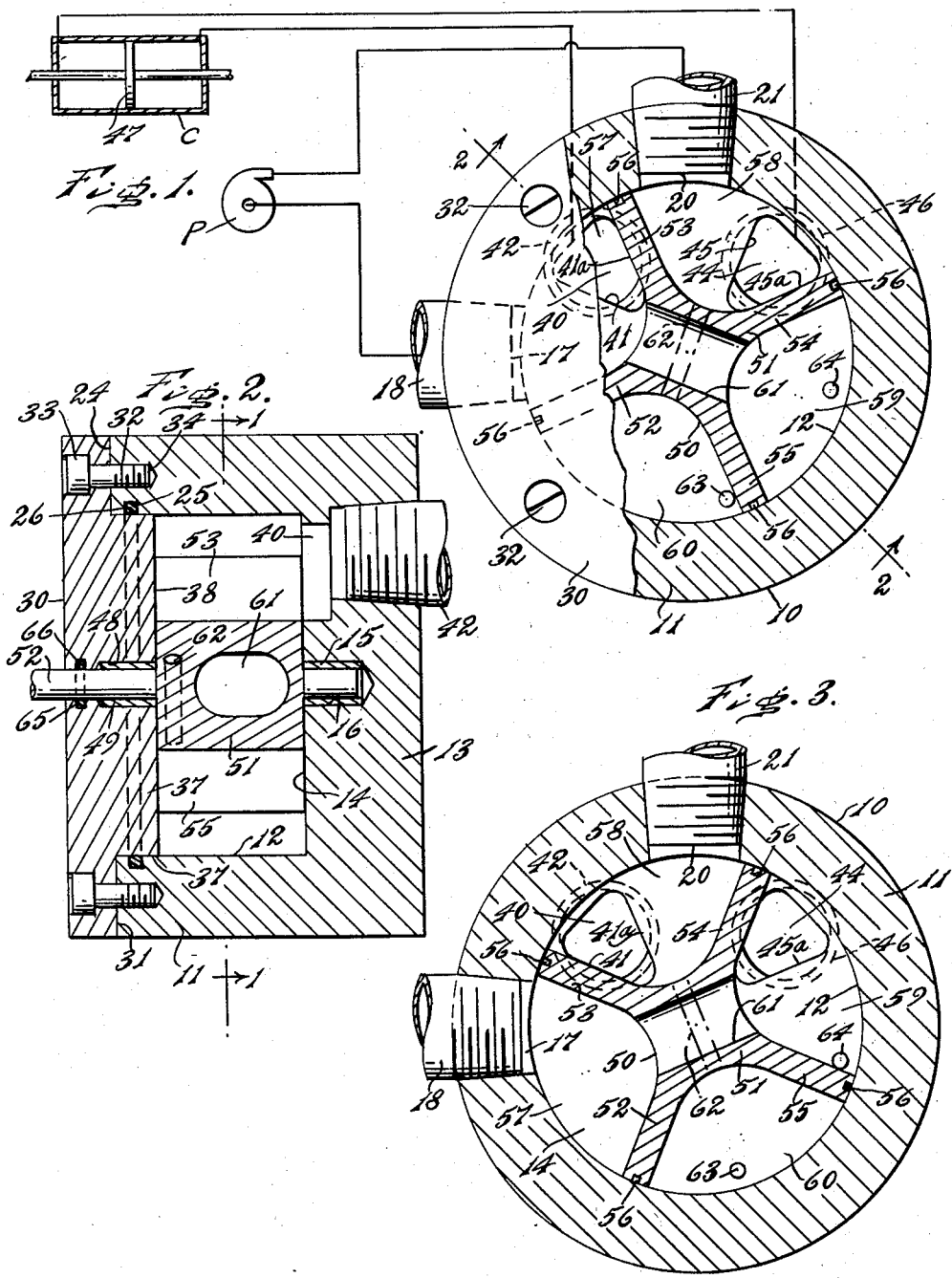

2,907,349

BALANCED ROTARY FOUR WAY VALVE

Howard T. White, Melrose Park, Pa.

Application July 15, 1958, Serial No. 748,701

12 Claims. (Cl. 137—624)

This invention relates to valves and more particularly to valves suitable for use in fluid systems, such as fluid motor systems, in which a change of direction of fluid in a cylinder and against opposite ends of a piston is involved.

It is the principal object of the present invention to provide a valve for fluid transfer which is completely balanced by the fluid acting therein.

It is a further object of the present invention to provide a valve for fluid transfer in which a valve member is provided, movable in a valve housing, and in which the movable valve member and flow controlling parts are not required to contact the housing.

It is a further object of the present invention to provide a valve of the character aforesaid which is completely sealed so that the same can be employed for handling corrosive, erosive or poisonous liquids and which is suitable for very high pressure operation.

It is a further object of the present invention to provide a valve suitable for use with liquids at high pressure and which by reason of the provisions for balancing of forces therein requires only a small force to effect a change of position of a movable part of the valve in either direction.

It is a further object of the present invention to provide a valve having an improved character of fluid cutoff.

It is a further object of the present invention to provide a valve in which the dynamic or impact effects of the fluid flowing therethrough are minimized.

It is a further object of the present invention to provide a valve which includes a housing with an improved arrangement of fluid connections thereto and a movable valve member therein which is simple in construction but effective in its action.

Other objects and advantageous features of the invention will be apparent from the description and claims.

The nature and characteristic features of the invention will be more readily understood from the following description, taken in connection with the accompanying drawings forming part thereof, in which:

Figure 1 is a view partly in end elevation and partly in section along the line 1—1 of Fig. 2 of a preferred form of valve in accordance with the invention and showing the movable valve member in one operating position;

Fig. 2 is a longitudinal sectional view, taken approximately on the line 2—2 of Fig. 1; and Fig. 3 is a transverse sectional view taken approximately on the line 1—1 of Fig. 2, and showing the valve member in the other operating position.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, the valve in accordance with the present invention preferably includes a housing 10 which can be integral with or separate from the apparatus to and from which the fluid transfer is to be effected.

One suitable apparatus for which the valve of the present invention is particularly adapted for use is shown in my application for patent for Fluid Pressure Systems, filed April 23, 1958, Serial No. 730,487, although the valve herein disclosed is not limited to use with that specific apparatus.

As illustrated, the housing 10 is shown of generally cylindrical shape and has an annular side wall 11 bounding a central cylindrical opening 12.

The housing is preferably closed at one end by an integral end wall 13 having an inner radially extending face 14 which can be provided with a bearing bushing 15 carried in a blind opening 16 in the end wall 13 and disposed in longitudinal axial alignment with the opening 12. The housing 10 is provided with a radially disposed port 17 in the annular face of the housing opening 12 in communication with the opening 12. The port 17 can be of circular shape and preferably has its longitudinal axis perpendicular to and intersecting the longitudinal axis of the housing opening 12.

A radially disposed fluid connection 18 which can be threaded in the side wall 11 of the housing 10 is provided and connected to the port 17. The fluid connection 18 can be connected to any suitable apparatus, such as the suction or inlet connection of a motor driven pump P.

The housing 10 is also preferably provided with a radially disposed port 20 in the annular face of the housing opening 12 and in communication with the opening 12. The port 20 can be of circular shape and preferably has its longitudinal axis perpendicular to and intersecting the longitudinal axis of the housing opening 12. A radially disposed fluid connection 21, which can be threaded in the side wall 11 of the housing 10 is provided and connected to the port 20. The fluid connection 21 can be connected to any suitable apparatus, such as the delivery or discharge connection of the pump P for the supply of liquid under pressure.

The longitudinal axis of the port 20 is preferably in a plane passing through the longitudinal axis of the opening 12 and disposed at 90° to a plane passing through the longitudinal axis of the opening 12 and in which the longitudinal axis of the port 17 is disposed, preferably with a tolerance of not more than plus or minus 1°.

The housing 10 has a transverse end face 24 surrounding the housing opening 12, and the housing opening 12, in spaced relation to the end face 24, is provided with an annular groove for the reception of a packing 26, such as an O-ring, for purposes to be explained.

A cover 30 is provided having a transverse or radially disposed face 31 for engagement with the end face 24 and is held in fixed relation to the housing 10 by bolts 32 extending through openings 33 in the cover and into blind openings 34 in the wall 11 of the housing 10.

The cover 30 is provided with a cylindrical boss 37 which extends longitudinally axially inwardly within the housing opening 12, and beyond the packing 26, and by its engagement with the packing 26 provides a seal at this location. The boss 37 has an inner transverse or radially extending end face 38.

The wall 13 is provided with a longitudinal axially extending port 40, preferably of substantially segmental or triangular shape and with side edges 41 and 41a which are respectively parallel to transverse radial lines intersecting the longitudinal axis of the opening 12. A longitudinally disposed fluid connection 42, which can be in threaded engagement in the wall 13 is provided and connected to the port 40.

The wall 13 is preferably also provided with a longitudinally axially extending port 44, preferably of substantially segmental or triangular shape and with side edges 45 and 45a which are respectively parallel to transverse radial lines intersecting the longitudinal axis of the opening 12. A longitudinally disposed fluid connection 46 which can be in threaded engagement in the wall 13 is provided and connected to the port 44.

One of the fluid connections 42 and 46, such as the fluid connection 42, can be connected to one end of a motor cylinder C in which a piston 47 is movable, and the other fluid connection, such as the fluid connection 46, can be connected to the other end of the motor cylinder C.

The central transverse axis of the port 40 is preferably in a radial plane intersecting the centrally longitudinal axis of the housing opening 12, this plane being disposed at a position intermediate the radially disposed axial planes of the ports 17 and 20.

The transverse longitudinal axis of the port 44 is preferably disposed in a plane intersecting the central longitudinal axis of the opening 12 at a location 90° from the radial longitudinal axial plane of the port 40.

The cover 30 is provided with an opening 48 on the longitudinal axis of the opening 12 with a bearing bushing 49 mounted therein.

Within the space in the housing opening 12 bounded by the end face 14 and the end face 38, a movable valve member 50 is provided having a central body portion 51 with one end of a longitudinally axially disposed shaft 52 extending therefrom and journalled in the bushing 15 and the other end of the shaft 52 extending through the bushing 49 and the opening 48 in the cover 30. The shaft 52 can be rotated through the desired angular movement in any preferred manner for controlling the positioning of the valve member 50, such as by a solenoid (not shown).

The central body portion 51 of the valve member 50 preferably has four vanes 52, 53, 54 and 55, extending radially therefrom in planes intersecting the central longitudinal axis of the opening 12. The vanes 52 and 54 are in an opposed pair and the vanes 53 and 55 are in an opposed pair with radial axial planes therethrough at an angle of 90° with respect to each other.

The vanes 52, 53, 54 and 55 at their outer ends can have a clearance with respect to the housing opening 12 of the order of four to eight one-thousandths of an inch, and can be provided with grooves 56 therealong for providing turbulence and reducing fluid flow thereby. The vanes 52, 53, 54 and 55 separate the interior space into four chambers, 57, 58, 59 and 60.

The central body portion 51 of the valve member 50 is provided with an opening 61 of substantial size therethrough and preferably substantially equal to that of the ports 40 and 44 for fluid transfer and pressure equalization connecting the chambers 59 and 60.

The body portion 51 is also provided with an opening 62 therethrough connecting the chambers 57 and 59 and providing for pressure equalization between these chambers.

The end edges of the vanes 52, 53, 54 and 55 and the central body portion 51 of the valve member 50 preferably have a total clearance longitudinally considered with respect to the faces 14 and 38 of the order of two to four one-thousandths of an inch.

The body 10, extending from the wall 13 into the opening, can be provided with stop pins 63 and 64, spaced angularly at 45° plus the thickness of the vane 55, for limiting the rotary movement of the valve member 50 in both directions.

The cover 30 is provided with an annular groove 65 for the reception of a packing 66, such as an O-ring, engaging the shaft 52 for preventing fluid leakage at this location.

The mode of operation will now be pointed out.

Assuming first that the valve member 50 is in the position illustrated in Fig. 1 and that fluid under pressure is supplied through the fluid connection 21 and through the port 20 to the chamber 58, fluid will be delivered from the chamber 58 and through the opening 62 to provide a balancing pressure in the chamber 60 on the valve member 50 in opposition to the pressure applied in the chamber 58. Fluid will also be delivered through the port 44 and the fluid connection 46 to the desired location of use, such as against one side of the piston 47.

At the same time, fluid returned, say from the opposite side of the piston 47 will be delivered through the fluid connection 42 and the port 40 to the chamber 57. Fluid will be delivered from the chamber 57 through the port 17 to the fluid connection 48 for return to the pump P. The pressure in the chamber 57 will be effective through the opening 61 for providing a balancing pressure in the chamber 59 in opposition to the pressure in the chamber 57.

When it is desired to change the direction of flow, the valve member 50 is actuated in any desired manner by turning the shaft 52, preferably through an angle of 45° in a counterclockwise direction, so that the edge of the vane 54 is moved past the port 44 and the edge of the vane 53 is moved past the port 40. This position of the valve is illustrated in Fig. 3.

In this position of the valve member 50, the port 40 will now be in communication with the chamber 58 between the vanes 53 and 54 and the port 20 will also be in communication with the chamber 58 for the delivery of fluid through the port 20 and to the fluid connection 21. The fluid pressure in the chamber 60 will be balanced with that in the chamber 58 through the opening 62. At the same time the port 44 will be in communication with the chamber 59 with which the chamber 57 is connected by the opening 61 for delivery of fluid therethrough and through the port 17 to the fluid connection 18 for return to the pump P.

The valve member 50 can then be returned, when desired, to the position first described and the operations repeated in timed sequence.

It will be noted that the vanes 54 and 55 in passing over the ports 40 and 44 have a shearing action for cutting off the flow so that the pressure effect on the valve member 50 tending to unbalance the valve member 50 is reduced to a minimum.

The leakage permitted past the ends of the vanes 52, 53, 54 and 55 and the side edges of these vanes is relatively small and more than compensates, in a practical way, for the elimination of contacting metal surfaces with friction and the requirement for lubrication and maintenance of such contacting metal surfaces.

It will also be noted that none of the vanes of the valve member 50, in the movement just described, cross the ports 17 and 20.

It will also be noted that the valve member 50 at all times has the opposing chambers 57 and 59, and 58 and 60 thereof in a balanced relation so that the radial forces applied through the shaft 52 in the bearings 15 and 49 are exceedingly small, and that by reason of the arrangement of the vanes 52, 53, 54 and 55 within the housing 10, no substantial longitudinal thrust is applied on the shaft 52.

Impact action of the fluid under pressure entering the opening 12 on the valve member 50 is also eliminated.

When used even with high pressure or high velocity fluids the force required to move the valve member 50 is very small and tendency of the valve member 50 to change its position because of the movement of the fluid controlled thereby is eliminated.

I claim:

1. A fluid transfer valve comprising a housing having a side wall with a central longitudinal opening and end closure walls for said opening, at least one of said end closure walls having a plurality of spaced longitudinal axial ports therethrough, said housing having in the side wall of said opening a plurality of spaced radial ports one of the radial ports being circumferentially intermediate said axial ports, a valve member having a body portion rotatably mounted in said housing, said body portion having at least two pairs of opposed vanes extending outwardly towards the side wall and providing a plurality of pairs of opposed chambers, fluid connections in said body portion respectively connecting the chambers of each opposed pair, said valve member in one of its positions having one of said chambers connecting one of said axial ports and one of said radial ports and another separated chamber connecting another of said axial ports and another of said radial ports, said valve member in another position having one of said chambers connecting said second axial port and said first radial port, said first axial port being in communication with one of said separated chambers and in communication with said second mentioned radial port through one of said fluid connections in said body and another chamber communicating therewith.

2. A fluid transfer valve as defined in claim 1 in which one of the end closure walls is integral with the side wall of the housing and the other end closure wall is provided on an end closure removably mounted with respect to said housing, and sealing members are interposed between said housing and said end closure.

3. A fluid transfer valve as defined in claim 1 in which said end closure walls are provided with bushings aligned with the central longitudinal axis of said central opening, and said body portion has shaft extensions journalled in said bushings.

4. A fluid transfer valve as defined in claim 1 in which said vanes have clearances along their outer marginal edges with respect to the wall of said opening, and said vanes and body portion have end clearances with respect to said end closure walls to permit limited fluid leakage at said clearances.

5. A fluid transfer valve comprising a housing having a side wall with a central longitudinal opening and end closure walls for said opening, one of said end closure walls having a plurality of longitudinal axial ports therethrough with planes passing through their axes and through the longitudinal axis of said opening disposed at a predetermined angle, said housing having in the side wall of said opening a plurality of radial ports with planes passing through their axes and through the longitudinal axis of said opening at the same predetermined angle, one of said planes of one of the radial ports being intermediate the planes of said axial ports, a valve member in said housing, said valve member having a body portion pivotally mounted in said end closure walls on the longitudinal axis of said housing opening, said body portion having at least two pairs of vanes extending outwardly towards the side wall and providing a plurality of pairs of opposed chambers, fluid connections in said body portion respectively connecting the chambers of each opposed pair, said valve member in one of its positions having one of said chambers connecting one of said axial ports and one of said radial ports and a separated chamber connecting another of said axial ports and another of said radial ports, said valve member in another position having said first chamber connecting said second axial port and said first radial port, said first axial port being in communication with said separated chamber and in communication with said second mentioned radial port through a fluid connection in said body and the chamber communicating therewith.

6. A fluid transfer valve as defined in claim 5 in which one of the end closure walls is integral with the side wall of the housing and the other end closure wall is provided on an end closure removably mounted with respect to said housing, and sealing members are interposed between said housing and said end closure.

7. A fluid transfer valve as defined in claim 5 in which said end closure walls are provided with bushings aligned with the central longitudinal axis of said central opening and said body portion has shaft extensions journalled in said bushings.

8. A fluid transfer valve as defined in claim 5 in which said vanes have clearances along their outer marginal edges with respect to the wall of said opening, and said vanes and body portion have clearances with respect to said end closure walls to permit limited fluid leakage at said clearances.

9. A fluid transfer valve comprising a housing having a side wall with a central longitudinal opening and end closure walls for said opening, at least one of said end closure walls having a plurality of longitudinal axial ports therethrough with planes passing through their axes and through the longitudinal axis of said opening disposed at a right angle, said housing having in the side wall of said opening a plurality of radial ports with planes passing through their axes and through the longitudinal axis of said opening at a right angle, one of said planes of one of the radial ports being intermediate the planes of said axial ports, a valve member in said housing, said valve member having a body portion pivotally mounted in said end closure walls on the longitudinal axis of said housing opening, said body portion having at least two pairs of opposed vanes extending outwardly towards the side wall and providing a plurality of pairs of opposed chambers, fluid connections in said body portion respectively connecting the chambers of each opposed pair, said valve member in one of its positions having one of said chambers connecting one of said axial ports and one of said radial ports and a separated chamber connecting another of said axial ports and another of said radial ports, said valve member in another position having said separated chamber connecting said second axial port and said first radial port, said first axial port being in communication with said separated chamber and in communication with said second mentioned radial port through a fluid connection in said body and the chamber communicating therewith.

10. A fluid transfer valve as defined in claim 9 in which one of the end closure walls is integral with the side wall of the housing and the other end closure wall is provided on an end closure removably mounted with respect to said housing, and sealing members are interposed between said housing and said end closure.

11. A fluid transfer valve as defined in claim 9 in which said end closure walls are provided with bushings aligned with the central longitudinal axis of said central opening and said body portion has shaft extensions journalled in said bushings.

12. A fluid transfer valve as defined in claim 9 in which said vanes have clearances along their outer marginal edges with respect to the wall of said opening, and said vanes and body portion have clearances with respect to said end closure walls to permit limited fluid leakage at said clearances.

No references cited.